UNITED STATES PATENT OFFICE 2,611,770

N-(2-THIAZOLYL)-2-HYDROXYPYRIDINE-5-SULFONAMIDES

James M. Smith, Jr., North Plainfield, N. J., assignor to American Cyanamid Company, New York, N. Y., a corporation of Maine No Drawing. Application April 16, 1949, Serial No. 88,027

9 Claims. (Cl. 260—296)

This invention relates to new sulfonamides and to intermediates for their manufacture.

I have discovered that certain substituted sulfonamides possess activity against certain viral and rickettsial strains, and may therefore become useful in the treatment of disease.

The new compounds of the present invention may be represented in one of their tautomeric forms by the following formula:

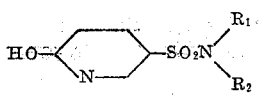

where $R_1$ represents hydrogen or an aliphatic, aralkyl or heterocyclic radical attached to the amide nitrogen atom, and $R_2$ represents a thiazolyl or isothiazolyl radical attached to the amide nitrogen by a carbon bond, and where the heterocyclic nucleus may contain one or more substituent radicals such as hydrogen, alkyl, aryl, aralkyl, alkaryl, acyl, carboxy and others.

The hydrogen atom of the hydroxy pyridine radical as well as that attached to the amide nitrogen where $R_1$ equals hydrogen are acidic in nature and may be replaced by simple neutralization with a cationic salt forming radical. Such salts are of particular value, especially in that the solubility of the compound is affected thereby, usually increased. Such salts are obviously included within the scope of the present invention.

The compounds of the present invention may be prepared by several methods. The preferred method is by the hydrolysis under alkaline conditions of compounds having the formula:

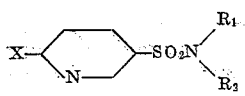

where X is a halogen and $R_1$ and $R_2$ are as indicated above. These intermediates are new and novel and while they posses no antiviral activity, appear to be most convenient intermediates for the preparation of the active compounds of this invention. The exact method of preparation of the new and novel intermediates and the method of the preparation of the new and novel therapeutic agents shall be outlined below and in the examples.

To prepare the intermediates for hydrolysis the preferred method involves the condensation of an appropriate 2-halopyridine-5-sulfonyl halide with an appropriate aminothiazole in accordance with the following equation:

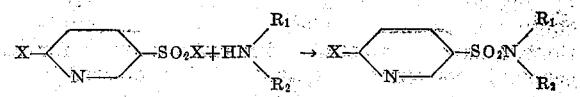

wherein $R_1$ and $R_2$ are as defined above. The halide on the pyridine radical as well as the halide of the sulfonyl radical are preferably chlorine, but bromine may be used if desired.

A preferred method of effecting the condensation is to bring together the reactants shown in the above equation at a temperature within the range 0° to 100° C. until the condensation is completed. It is preferred that the condensation be conducted with the reactants dissolved or suspended in a tertiary nitrogen base such as pyridine or an organic solvent containing a basic compound such as sodium carbonate or trimethylamine as acid acceptor or in an aqueous medium containing a substance which will react with the hydrohalide acid formed during the reaction and prevent it from interfering with the reaction.

Obviously, primary or secondary amines should not be used to bind the acid formed in the reaction, as they would tend to react with the sulfonyl halide and reduce the yield or desired product. One or more moles excess of the tertiary nitrogen base or alkaline substance is desirable. In some cases substantially the same result can be obtained by the use of an excess quantity of the aminoheterocycle intermediate as acid acceptor.

The time of the reaction may vary from a few minutes to several hours, depending upon the nature of the reactants, temperature, the quantity of the batch, and other factors. The details of the particular reactions may be worked out by persons skilled in the art without undue experimentation.

To prepare products in which $R_1$ is an organic radical, secondary amines such as 2-(N-beta-hydroxyethyl)-aminothiazole, and 2-(N-methylamino)-benzothiazole are employed.

The useful intermediates of this invention are recovered by precipitating in cold dilute acid solution. The purified intermediates may then be hydrolyzed by heating in the presence of alkali, and the therapeutically active compounds are recovered after the reaction has run to completion by precipitation in cold dilute acid.

The hydrolysis is best carried out in solution of strong bases such as sodium hydroxide, potassium hydroxide and barium hydroxide. It is also possible to achieve the hydrolysis by the use of quaternary ammonium bases such as tetraethylammonium hydroxide, trimethylbenzylammonium hydroxide, etc., but they offer no special advantages over the above named inorganic bases.

The optimum concentration for the alkaline material is approximately 15% of the basic material but the hydrolysis can be run in any concentration over 1 N of sodium hydroxide or its equivalent in activity.

The hydrolysis best takes place in aqueous solution but the presence of inert solvents is not precluded and may offer some advantages. Aqueous pyridine mixtures are useful as solvents in this respect.

The hydrolysis proceeds at economic rates at temperatures above 90° C. and I have found that the range 100–105° C., i. e., reflux conditions, is sufficient for the type of hydrolysis desired. Greater rapidity of hydrolysis, of course, occurs at higher temperatures but special pressure equipment is then needed. Under reflux conditions, I have found that 1–6 hours are ample for economic conversion. Actually, it is preferred to continue the hydrolysis for 3 hours in order to assure adequate yields.

The invention will now be illustrated by detailed description of the preparation of representative intermediates and active compounds in the following examples. It is understood that these compounds are merely cited by way of examples and the invention is not to be limited thereto. All parts are by weight unless otherwise indicated.

Example 1

8 grams of 2-chloropyridine-5-sulfonyl chloride is added to a cold solution of 10 g. of 2-aminothiazole in 50 cc. of dry pyridine. The temperature rises from 10° to 25° C. at once, and during 45 minutes it rises further to 35–40° C. After standing at room temperature for 12–14 hours the solution is poured into cold dilute hydrochloric acid. The final mixture is at pH 2.5–3.5. The brown precipitate of crude N-(2-thiazolyl)-2-chloropyridine-5-sulfonamide is collected on the filter and washed with water, then dried to give 8 g. of product. It can be purified by recrystallization from alcohol-water mixture or dimethylformamide-water mixture, using activated charcoal as a decolorizing agent. The compound when pure melts at 224.5°–226.5° C.

Example 2

By following the procedure of Example 1 with substitution of an equivalent weight of the corresponding amino heterocycles, the following products are obtained:

| Product | Melting Point |
|---|---|
| | °C. |
| N-(4-methyl-2-thiazolyl)-2-chloropyridine-5-sulfonamide | 179–180.5 |
| N-(4-phenyl-2-thiazolyl)-2-chloropyridine-5-sulfonamide | 203–206 |
| N-(4,5-dimethyl-2-thiazolyl)-2-chloropyridine-5-sulfonamide | 227–228 |
| N-(2-benzothiazolyl)-2-chloropyridine-5-sulfonamide | 251–254 |

Example 3

15 parts of N-(2-thiazolyl)-2-chloropyridine-5-sulfonamide, prepared as in Example 1, is boiled under reflux in 100 parts of 15% sodium hydroxide solution for 5 to 6 hours. The amber colored solution is cooled and acidified to Congo red test paper with dilute hydrochloric acid. The tan precipitate is collected on the filter, washed and dried. 12 parts of product are obtained. It is dissolved in 1,000 parts of water with the minimum amount of sodium hydroxide (alkaline to benzoazurine test paper), treated with activated charcoal and clarified. Dilute hydrochloric acid is added to precipitate the product which is filtered, washed and dried. Seven parts of N-(2-thiazolyl)-2-hydroxypyridine-5-sulfonamide are obtained, melting point 292–295° C. with decomposition.

Example 4

By the following the procedure of Example 3 with substitution of the corresponding N-substituted-2-chloropyridine-5-sulfonamides, the following products are obtained:

| Product | Melting Point |
|---|---|
| | °C. |
| N-(4-methyl-2-thiazolyl)-2-hydroxypyridine-5-sulfonamide | 281–283.5 |
| N-(4-phenyl-2-thiazolyl)-2-hydroxypyridine-5-sulfonamide | 323.5–325.5 |
| N-(4,5-dimethyl-2-thiazolyl)-2-hydroxypyridine-5-sulfonamide | 323–330 |
| N-(2-benzothiazolyl)-2-hydroxypyridine-5-sulfonamide | 303–305 |

In a similar fashion the intermediates and compounds of the table may be prepared:

Table

| Intermediate | Final Product |
|---|---|
| N-(5-carboxy-2-thiazolyl)-2-chloropyridine-5-sulfonamide. | N-(5-carboxy-2-thiazolyl)-2-hydroxypyridine-5-sulfonamide. |
| N-(4-methyl-2-thiazolinyl)-2-chloropyridine-5-sulfonamide. | N-(4-methyl-2-thiazolinyl)-2-hydroxypyridine-5-sulfonamide. |
| N-(5-methyl-2-thiazolinyl)-2-bromopyridine-5-sulfonamide. | N-(5-methyl-2-thiazolinyl)-2-hydroxypyridine-5-sulfonamide. |
| N-(4,5-dimethyl-2-thiazolinyl)-2-chloropyridine-5-sulfonamide. | N-(4,5-dimethyl-2-thiazolinyl)-2-hydroxypyridine-5-sulfonamide. |
| N-(4-benzyl-2-thiazolyl)-2-chloropyridine-5-sulfonamide. | N-(4-benzyl-2-thiazolyl)-2-hydroxypyridine-5-sulfonamide. |
| N-(3-ethyl-2-thiazolinyl)-2-iodopyridine-5-sulfonamide. | N-(3-ethyl-2-thiazolinyl)-2-hydroxypyridine-5-sulfonamide. |
| N-(3,5-dimethyl-4-carboxythiazolin-2-yl)-2-chloropyridine-5-sulfonamide. | N-(3,5-dimethyl-4-carboxythiazolin-2-yl)-2-hydroxypyridine-5-sulfonamide. |
| N-(2-thiazolinyl)-2-chloropyridine-5-sulfonamide. | N-(2-thiazolinyl)-2-hydroxypyridine-5-sulfonamide. |

What I claim is:

1. Compounds of the group consisting of those having the formula

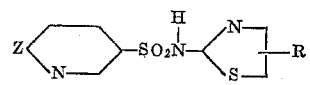

where Z is chosen from the group consisting of halogen and hydroxyl radicals, and R is a member of the group consisting of hydrogen, alkyl, aralkylhydrocarbon and aryl hydrocarbon radicals.

2. N-(2-thiazolyl)-2-chloropyridine-5-sulfonamide.

3. N-(2-thiazolyl)-2-hydroxypyridine-5-sulfonamide.

4. N-(4-methyl-2-thiazolyl)-2-hydroxypyridine-5-sulfonamide.

5. N-(4,5-dimethyl-2-thiazolyl)-2-hydroxypyridine-5-sulfonamide.

6. The method of preparing compounds of the general formula

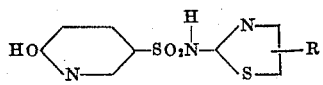

where R is a member of the group consisting of hydrogen, alkyl, aralkylhydrocarbon, and aryl hydrocarbon radicals which comprises hydrolyzing compounds of the formula

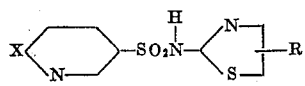

where X is a halide and R is as represented above, in an aqueous alkaline solution at a temperature in the range 90–120° C.

7. Method of preparing N-(2-thiazolyl)-2-hydroxypyridine-5-sulfonamide which comprises hydrolyzing N-(2-thiazolyl)-2-chloropyridine-5-sulfonamide in an aqueous alkaline solution and recovering the above mentioned product.

8. The method of preparing N-(4-methyl-2-thiazolyl) - 2 - hydroxypyridine - 5 - sulfonamide which comprises hydrolyzing N-(4-methyl-2-thiazolyl) -2- chloropyridine -5- sulfonamide in an aqueous alkaline solution and recovering the above mentioned product.

9. The method of preparing N-(4,5-dimethyl-2-thiazolyl) - 2 - hydroxypyridine - 5 - sulfonamide which comprises hydrolyzing N-(4,5-dimethyl-2-thiazolyl)-2-chloropyridine-5-sulfonamide in an aqueous alkaline solution and recovering the above mentioned product.

JAMES M. SMITH, Jr.

No references cited.